Patented Nov. 30, 1948

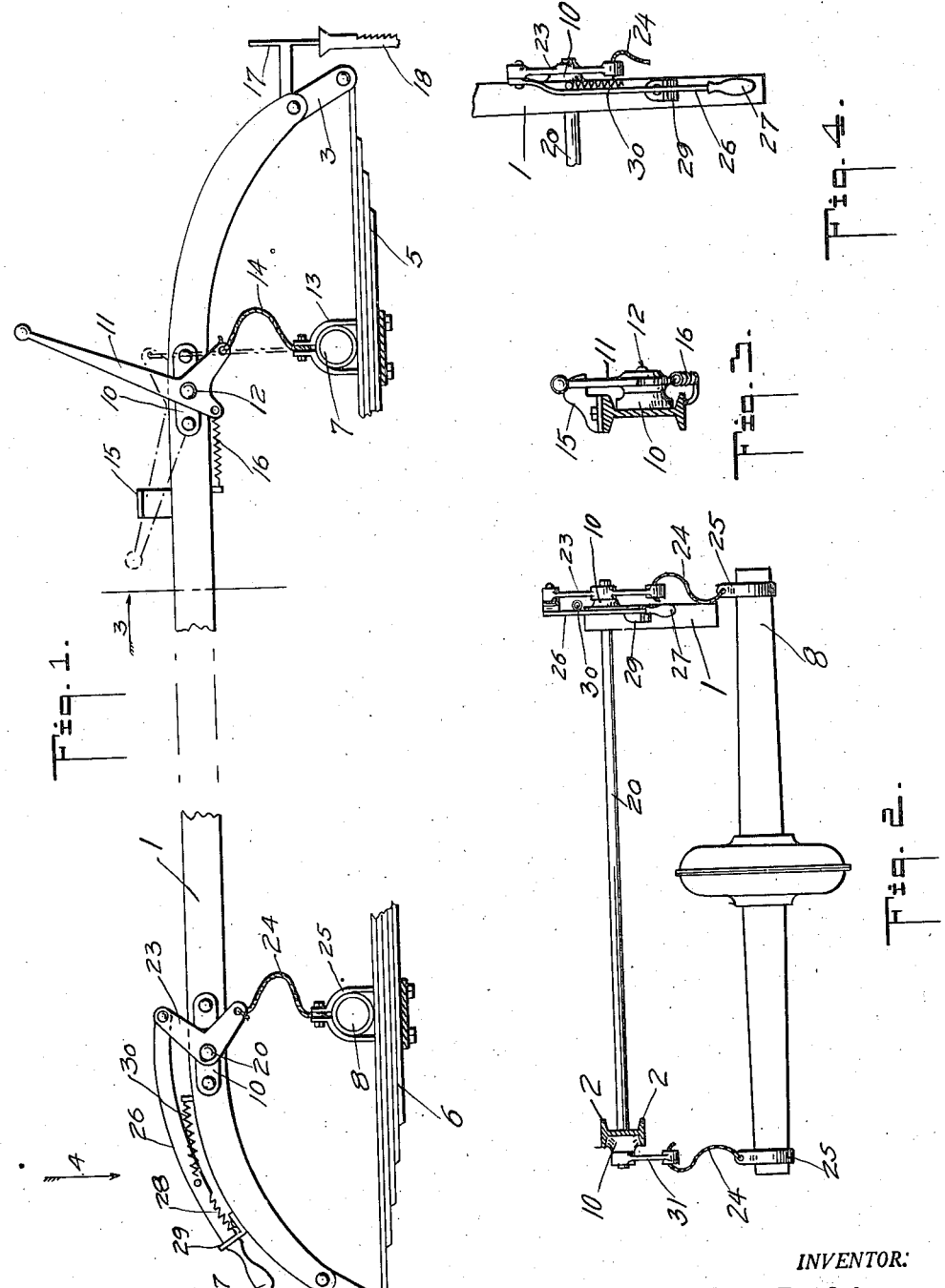

2,454,996

UNITED STATES PATENT OFFICE 2,454,996

SPRING HOLDING DEVICE FOR VEHICLES

Francis L. Dahleen, Los Angeles, Calif.

Application June 27, 1945, Serial No. 601,841

2 Claims. (Cl. 280—150)

1

The present invention relates to attachments for automobiles adapted to facilitate the jacking-up operations required primarily to tire exchanging.

In the automobile, as designed at the present time, it has become so inconvenient for the motorist to reach under the car body to apply the jack to the axles, that the type of jack now generally used is applied to the front and rear bumpers of the car to lift the car body. But because the axles remain unsupported during this lifting operation it is found that the weight of the wheels and axles causes the springs to sag and that, for this reason, it becomes necessary to raise the bumper at the end of the car body to which the jack is applied several times the distance necessary to elevate the wheels for tire exchanging.

Anyone having had to exchange tires on the road has experienced the difficulty of this lifting operation, and various devices have been developed aiming at overcoming this very unsatisfactory condition. The present invention has for its object to provide simple and effective means for tying the wheel axles to the chassis preparatory to the jacking operation and so as to prevent sagging of the springs.

Further objects and the advantages of my invention will become apparent upon perusal of the following detailed description, and reference is invited to the accompanying drawings, in which preferred forms of the invention are illustrated.

In the drawings:

Fig. 1 is a fragmentary side view of an automobile chassis showing the ends of one chassis frame member and the wheel axles suspended therefrom;

Fig. 2 is a rear view of the chassis and rear axle and illustrates the relation to these parts held by the devices of my invention;

Fig. 3 is a detail view of part of the front end of the chassis, substantially as viewed in the direction of the arrow 3 of Fig. 1; and Fig. 4 shows details of the rear portion of Fig. 1, as viewed in the direction of the arrow 4.

The numeral 1 designates the frame member shown in Fig. 1, and both frame members 1 and 2 are shown in Fig. 2. The usual shackles 3, 4 support the springs 5, 6, and the axles 7, 8 are anchored on the springs in the conventional manner by means of U-bolts.

A bearing 10 is suitably secured to the frame member 1, and a lever 11 is journaled in this bearing by means of a pivot or bolt 12. A clamp 13 is fastened to the front axle 7, and a normally slack cable 14 interconnects this clamp with the lower

2 end of the lever 11. This lever, which takes a position within the hood of the car, is swung backward, into the position indicated in dotted outline, to draw the cable taut, and it is thereupon shifted sidewise in position to lodge under a stop lug 15 and so to maintain the cable tightly stretched.

While the lever is held so-locked, it is not possible for the spring 5 to sag, and the axle and wheel thereon rise with the car body when the jack 18 is operated to raise the front bumper 17. Upon completion of the tire exchange, the lever 11 is again released from the stop lug 15 and returned to its initial position. A spring 16 will maintain the lever in this position. It is to be understood that a corresponding cable tightening mechanism is mounted on the frame member 2 to serve the other end of the wheel axle in like manner.

The principle of operation of the devices attached to the rear axle remains substantially unchanged but, because of differences in car body design, various structural modifications are necessary, as will now be described in detail.

As shown in Figs. 1, 2 and 4, a transverse shaft 20 is journaled in bearings 10 of the frame members 1 and 2. To one end of this shaft is secured a bellcrank 23, from the lower end of which extends a slack cable 24 to a clamp 25 of the axle housing 8. A bar 26 is pivotally hung in the upper end of the bellcrank and it extends rearwardly along the rear portion of the frame member. The bar terminates in a handle 27 and it is, intermediate its ends, made with a series of notches 28.

To operate this mechanism it is merely required to draw the bar rearward until the cable becomes taut. A slotted bracket 29 is shown mounted on the frame member to guide the bar 26 and it is found that one of the notches 28 will engage this bracket as the bar is pulled rearwardly, to lock the bar in position. A spring 30 is provided to urge the bar forward and the notches into engagement with the bracket 29.

Since the movement of the bar operates to rotate the shaft 20, it is seen that one such bar will control the cable tightening device at both ends of the shaft 20. The upper end of the bellcrank is, for this reason, omitted at the opposite end of the shaft and a simple arm 31 may be substituted. In all other respects, the mechanism at both ends of the shaft may remain the same.

But while the operation of the cable tightening devices at the rear end of the car body is simplified by the introduction of the shaft 20, I wish it understood that this shaft may be omitted, and that a lever similar to the lever 11 together with the devices associated therewith, may be substituted. It is also to be understood that, where sufficient space is available, the cable tightening devices at the front of the car body may be similarly interconnected by means of a cross shaft and the handle end of one of the levers 11 omitted.

Further modifications, within the scope of the claims hereto appended may also be embodied with the view to provide a simple, economical and efficient wheel and axle supporting device.

I claim:

1. A spring holding device for a vehicle having right and left frame members and a spring supported wheel axle comprising, a guide on one of said members, a shaft transversely seated in said frame members above said axle, arms on the ends of said shaft, clamps on the axle below said arms, normally slack flexible elements extending from said arms to the said clamps, a notched bar pivotally hung on one of said arms and extending through said guide, the bar being lengthwise movable in the guide to rotate the shaft and thereby to tighten said flexible elements, a notch of the bar engaging the guide to maintain the elements taut.

2. A spring holding device for a vehicle having right and left frame members and a spring supported wheel axle comprising, a shaft seated in said frame members above and parallel with said axle, arms on the ends of said shaft, clamps on the axle below said arms, normally slack flexible elements extending from said arms to the said clamps, a notched bar extending from one of said arms, a guide for said bar, the latter being manually movable lengthwise to rotate said shaft and arms to tighten said elements at the same time causing one of the notches of the bar to engage the guide to lock the bar in position when so moved to maintain the elements taut, and means urging return of the bar to its initial position within the guide.

FRANCIS L. DAHLEEN.

REFERENCES CITED

The following references are of record in the file of this patent:

UNITED STATES PATENTS

| Number | Name | Date |
|---|---|---|
| 1,544,233 | Igo | June 30, 1925 |
| 1,713,687 | Bendix | May 21, 1929 |
| 1,915,134 | MacPherson | June 20, 1933 |

FOREIGN PATENTS

| Number | Country | Date |
|---|---|---|
| 35,985 | France | Mar. 31, 1930 |
| 651,514 | France | Oct. 9, 1928 |